(12) United States Patent
Delén et al.

(10) Patent No.: US 7,665,276 B2
(45) Date of Patent: Feb. 23, 2010

(54) APPARATUS FOR SEALING A PACKAGE

(75) Inventors: Anders Delén, Kävlinge (SE); Jan Svensson, Löddeköpinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 227 days.

(21) Appl. No.: 10/577,039

(22) PCT Filed: Nov. 12, 2004

(86) PCT No.: PCT/SE2004/001645

§ 371 (c)(1),
(2), (4) Date: Apr. 24, 2006

(87) PCT Pub. No.: WO2005/049428

PCT Pub. Date: Jun. 2, 2005

(65) Prior Publication Data

US 2007/0074491 A1    Apr. 5, 2007

(30) Foreign Application Priority Data

Nov. 24, 2003  (SE)  .................................... 0303150

(51) Int. Cl.
*B65B 51/14* (2006.01)
*B31B 1/64* (2006.01)
*B65B 51/22* (2006.01)

(52) U.S. Cl. .................... 53/374.8; 53/373.7; 53/479; 53/DIG. 2; 493/133; 493/209

(58) Field of Classification Search ............ 53/373.7, 53/374.8, 479, DIG. 2; 493/133, 189, 206, 493/209
See application file for complete search history.

(56) References Cited

U.S. PATENT DOCUMENTS 2,751,965 A  *  6/1956  Miller ........................... 53/76
2,955,643 A  *  10/1960  Shapero et al. ................ 53/76

(Continued)

FOREIGN PATENT DOCUMENTS

DE    28 12 138 A1    9/1979

(Continued)

OTHER PUBLICATIONS

English language translation of Official Action dated Mar. 17, 2009 in corresponding Japanese Application No. 2006-541082.

*Primary Examiner*—Stephen F Gerrity
(74) *Attorney, Agent, or Firm*—Buchanan, Ingersoll & Rooney, PC (57) ABSTRACT

The disclosure relates to an apparatus for sealing a package. The apparatus comprises a sealing unit and an abutment between which a number of material layers are disposed to be clamped and sealed and fused together, wherein the abutment is connected to at least one elongate element which extends in a direction from the abutment towards and past the sealing unit, the elongate elements, beyond the sealing unit are disposed to be connected to at least one first operating element, and an operating unit is disposed to apply a force between the sealing unit and the first operating element so that these are moved in a direction away from one another and so that the abutment and the sealing unit are moved in a direction towards one another.

12 Claims, 6 Drawing Sheets

U.S. PATENT DOCUMENTS

| | | | |
|---|---|---|---|
| 3,986,921 A * | 10/1976 | Putnam et al. | 156/583.1 |
| 4,040,237 A * | 8/1977 | O'Brien | 53/551 |
| 4,072,089 A | 2/1978 | Bosche | |
| 4,097,318 A * | 6/1978 | Olschewski | 156/69 |
| 4,193,833 A | 3/1980 | Young | |
| 4,241,560 A | 12/1980 | Deimel et al. | |
| 4,243,469 A * | 1/1981 | Evers et al. | 156/583.1 |
| 4,484,977 A | 11/1984 | Andersson | |
| 4,537,012 A * | 8/1985 | Groom et al. | 53/552 |
| 4,581,873 A | 4/1986 | Knuppertz et al. | |
| 4,622,798 A | 11/1986 | Oki | |
| 5,568,718 A * | 10/1996 | Lerner et al. | 53/75 |
| 5,791,126 A * | 8/1998 | Kammler et al. | 53/546 |
| 7,011,129 B2 * | 3/2006 | Kammler et al. | 156/580 |
| 7,017,641 B2 * | 3/2006 | Kammler et al. | 156/580 |
| 7,036,293 B2 * | 5/2006 | Kammler et al. | 53/551 |
| 2002/0017077 A1 * | 2/2002 | Klinkel | 53/373.7 |

FOREIGN PATENT DOCUMENTS

| | | |
|---|---|---|
| EP | 0 708 022 B1 | 6/1998 |
| EP | 1 066 951 A2 | 1/2001 |
| JP | 59-15004 A | 1/1984 |
| JP | 61-93408 U | 6/1986 |
| JP | 2-205505 A | 8/1990 |
| JP | 6-44706 U | 6/1994 |
| JP | 2002-46713 A | 2/2002 |
| SU | 610641 | 6/1978 |
| SU | 692707 A1 | 10/1979 |
| WO | WO 96/21595 A1 | 7/1996 |
| WO | WO 01/94234 A1 | 12/2001 |

* cited by examiner

APPARATUS FOR SEALING A PACKAGE

TECHNICAL FIELD

The present invention relates to an apparatus for sealing a package, comprising a sealing unit and an abutment between which a number of material layers are disposed to be clamped and fused together. The present invention further relates to a method of sealing a package.

BACKGROUND ART

One conventionally viable method of sealing together plastic-coated, fibre-based packaging laminates is so-called ultrasound sealing. In accordance with this technology, the material layers which are to be fused and sealed together are clamped between an ultrasound horn and an abutment. The ultrasound horn vibrates the material, and because of different types of hysteresis losses in the material and in the interface therebetween, the material will be heated up so that the plastic partly melts and, because of the compression, is fused and welded together. However, this technology is conventionally employed and. well-known to a person skilled in the art and will not be described in greater detail here.

EP708022B1 discloses the ultrasound sealing of the top seal on a so-called gable top package. In accordance with this construction, the material which is to be sealed is pressed against the abutment with the aid of the ultrasound horn. This publication focuses on solving a problem inherent in vibrating free edges which could give rise to dust. This is solved by means of a special arm which extends parallel with the ultrasound horn and abuts against the free edge in order thereby to reduce the vibrations in the free edge.

U.S. Pat. No. 4,581,873 discloses another construction for ultrasound sealing of the upper seal of a brick-shaped package. In this construction, the ultrasound horn is suspended in a complex linkage system which is activated in that a moment of force is applied on a pivot in one linkage. In its turn, the abutment is also suspended in a z-shaped linkage which in turn is activated in that another moment of force is applied on another pivot in this linkage. The publication focuses on realising a separate driving of the ultrasound horn and the abutment. Once the ultrasound horn and the abutment are in the correct position, a compression force is applied on them in that a compression cylinder is activated. This compression cylinder acts by the intermediary of a unit which is fixedly anchored to the ultrasound horn and a linkage which in turn acts on a heel on a unit fixedly anchored to the abutment. By such means, the ultrasound horn will be displaced in that the entire suspension apparatus for the ultrasound horn is moved towards the package and the abutment. Because the first linkage is stationary, this movement of the ultrasound horn will in turn be absorbed by a spring which, after completed sealing, will return the ultrasound horn to the position where the horn and the abutment are operated separately from each other.

WO01/094234 discloses an ultrasound horn and an abutment for sealing a tubular packaging blank with a so-called overlap seal. Such a seal is formed in that the tube is created by two longitudinal edges being sealed together in that the one edge is laid on the outside of the material adjacent the second edge. In order to be adapted for sealing a tube of such type, the ultrasound horn is provided with a recess which is adapted to accommodate the extra material thickness which occurs at the overlap seal.

WO96/21595 discloses another system where the abutment is provided with a recess for accommodating the larger material thickness at the overlap joint.

Sealing systems of the above-mentioned types are constructed usually so as to obtain a correct seal in a repeatable manner. They must be simple in their basic design and construction and be capable of sealing packages in a correct manner even if the packaging material and the configuration or position of the package vary within certain limits. Moreover, they must often be capable of pre-forming the package in connection with the sealing operation so as to realise a seal which is formed after the final folding of the package. The above-described designs and constructions are not entirely satisfactory in respect of these criteria. The first construction is adapted for a certain formation of a gable top package but not for forming a brick-shaped package with downwardly folded corner flaps. The second construction is far too complex and it is moreover difficult to obtain a correct compressive force when compressed air is to be fed to the cylinder when this is to realise the compression of the packaging material between the ultrasound horn and the abutment. Both of the latter constructions suffer from the drawback that the package and its overlap seal must be fitted into the recess in the ultrasound horn and the abutment, respectively, in order that a correct seal be obtained.

Thus, there is no satisfactory solution to the basic constructional requirements which are in place. Consequently, one object of the present invention is to realise an apparatus which satisfies, or in its basic design and construction makes it easy to satisfy the above-outlined and other constructional requirements which are placed on a sealing apparatus of the type disclosed by way of introduction.

BRIEF OUTLINE OF THE INVENTION

The above objects have been attained according to the present invention by means of an apparatus of the type disclosed by way of introduction which has been given the characterising features that the abutment is connected to at least one elongate element which extends in a direction away from the abutment, towards and past the sealing unit, that the elongate elements, beyond the sealing unit, are disposed to be connected to at least one first operating element, and that an operating element is disposed to apply a force between the sealing unit and said first operating element so that these are moved in a direction away from one another and so that the abutment and the sealing unit are moved in a direction towards one another. By designing the apparatus in this manner, it is possible to realise a construction where only a limited number of components project over the transport path where the packages which are to be sealed are transported. Moreover, it is simple to design the system so that the abutment and the sealing unit move towards one another in proportional speeds and, if the operating unit is rendered symmetrical as regards the supply of force, the abutment and the sealing unit will move symmetrically towards one another. This symmetric movement is desirable in many cases, since there will then automatically be obtained a symmetric folding of the package in connection with the sealing operation. Moreover, this construction is desirable since those components which move in the proximity of the path of the package may be designed as simple pull rods while the slightly more complex construction which is required for the operating unit may be positioned a distance from the transport path of the package, which implies that it will be simpler to maintain a high level of hygiene in the proximity of the package. Simple pull rods are also favourable in respect of the possibility of employing a laminar air flow for maintaining the high level of hygiene without excessive disruption to the air flow. The air may be sterile air, or at least air purified of particles.

Embodiments of the present invention are apparent from the following description.

According to one embodiment, the apparatus comprises at least two elongate elements which extend away from the abutment, towards and past the sealing unit. By employing two elongate elements, it is simple to ensure that the desired parallel state is obtained both on movement and on the application of force. It might once again be mentioned that the simplification of the construction (the need for mechanically rigid anchorage points is obviated using the pairwise application of tractive force) implies that the level of hygiene can be maintained at a satisfactory level in a simpler manner.

Preferably, the force is applied from the operating unit to the sealing unit by the intermediary of a second operating element comprising at least two force-restricting coupling members which are disposed to restrict the force between the operating element and the sealing element and thereby the force between the abutment and the sealing unit. By such means, it is possible to ensure that the correct compressive force is always obtained at the sealing site even if the material were to have slightly deviating thickness in relation to the expected thickness. As was mentioned above, it is advantageous if the force-restricting element is located at that part of the mechanism which is not located over the package which is to be sealed. A further advantage is that if there were to be any failure in the machine, the force-restricting coupling member can contribute in reducing the risk that the relatively expensive sealing unit is damaged because of anything being clamped between the sealing unit and the abutment in an incorrect manner. For example, the force-restricting element may consist of some form of mechanical spring, pneumatic or hydraulic cylinder, pneumatic or hydraulic membrane or the like which gives a certain maximum force. A powerfully pre-tensioned mechanical spring normally delivers increasing force even after the pre-tensioning force has been passed, but this increase in force may, because of further compression, be almost negligible with the correct choice and design of the spring, level of pre-tensioning and the surrounding construction. Pneumatic and hydraulic systems may deliver a fixed maximum force which is the same even on continued movement of the operating unit.

According to one preferred embodiment, the second operating element comprises at least a first and a second component, the first component being disposed at least partly to surround the second component and the force-restricting coupling member, the coupling member being disposed to apply a force between the components so that they strive to be urged away from each other, and this striving to be urged away from each other being restricted by that portion of the first component which surrounds the second component and is disposed to abut against the second component. With the aid of this construction with so-called overshot, the sealing unit supported by the second operating element will move with the operating element as if it were fixedly anchored until the abutment and the sealing unit press against one another with a force which exceeds the limit level of the force-restricting coupling member. Once the limit position has been achieved, that part which supports the sealing unit will not move even though the operating unit continues its movement.

Advantageously, the coupling member comprises a membrane whose outward bending is disposed to be operated by means of a pressurised fluid, such as a liquid or gas. As was mentioned above, such a coupling member will transfer a force which is proportional to the active area and the pressure in the membrane and which will thus be constant as soon as the limit level has been reached.

According to one preferred embodiment, the operating unit comprises an interconnection member which is displaceable substantially transversely of the direction of movement of the sealing unit and the abutment and which, on the one hand, is connected to the sealing unit by the intermediary of a first linkage which is pivotally connected to the interconnection member and that one of said first and second components of the second operating element which is not connected to the sealing unit and which, on the other hand, is connected to the first operating element by the intermediary of a second linkage which is pivotally connected to the interconnection member and the second operating element. By such means, operation of the interconnection member in the transverse direction positively causes a relative movement between the first and the second operating element along the elongate elements. This construction is normally designated a toggle mechanism where the interconnection member corresponds to the toggle or elbow joint and the linkages correspond to the upper arm and forearm. One advantage in such a construction is that when the linkages make an acute angle (at the start of the convergence of the abutment and the sealing unit), a minor movement of the interconnection member will give a relatively large displacement of the abutment and the sealing unit, and when the linkages extend as good as straight out each in its direction (at the end of the convergence movement), there will be obtained but a slight movement in the sealing unit and the abutment for displacement of the interconnection member. At the end of the movement, the gear ratio in the movement will also entail that, with a limited force on the interconnection member, it is possible to generate a very powerful compression of the abutment and the sealing unit.

Advantageously, the second operating unit is slidingly connected to said elongate elements. By such means, the system will automatically contribute in counteracting outward flexing transversely of the elongate elements.

Preferably, the operating unit is disposed, in a nominal end position, to bring together the sealing unit and the abutment to such an extent that a gap is formed between them, this gap being of a width which is less than the total thickness of the material layers which are intended to be sealed together, and preferably less than the total thickness of the material layers which are intended to be sealed together which is obtained when the sealing unit and the abutment are urged towards one another with a force which is defined by a force-restricting coupling member.

By such means, it will be ensured that a correct compression and sealing can always be obtained, at the same time as, by the reliable provision of a gap, it is ensured that the abutment and the sealing unit do not come into contact with one another, which implies that, in this regard, the risk of damage to the usually relatively expensive sealing unit has been eliminated.

The above objects have also been attained according to the present invention by means of an apparatus of the type described by way of introduction which has been given the features that the abutment and the sealing unit are connected to a common operating unit and are disposed to be brought together towards one another in that both the sealing unit and the abutment are displaced with substantially the same speed profile towards one another, and that the package is disposed to be displaced in a direction transversely of the direction of movement of the sealing unit and the abutment. By such means, it is simple to obtain a symmetric compression and forming of the seal. By designing the system so that the package is displaced transversely of the direction of movement of the sealing unit and the abutment, it is possible to obtain an optional relative movement between the sealing unit and the abutment on the one hand and the package on the other, with the result that it is possible to optimise these movements so as to obtain a correct forming of that portion of the package which is to be sealed.

Advantageously, the apparatus is operative initially to displace the package at a higher speed in the transverse direction than the speed of the sealing unit and the abutment in their respective directions of movement, whereafter the apparatus is operative to displace the package at a lower speed in the transverse direction than the speed of the sealing unit and the abutment in their respective directions of movement, whereafter the apparatus is operative to displace the package at a higher speed in the transverse direction than the speed of the sealing unit and the abutment in their respective directions of movement. By such means, there will initially be obtained a correct positioning of the package, whereafter the package is clamped together until there is but limited space between the sealing unit and the abutment. In this position, the package described by way of example as tubular in form has been clamped together so that there is formed a so-called praying transverse seal. Thereafter, the apparatus is operative to displace the package at a higher speed in the transverse direction than the speed of the sealing unit and the abutment in their respective directions of movement. By such means, there will be realised a final compression of that portion of the package which is to be sealed. This compression is, for example, advantageous for packages where the outermost portions of the sealing fin are to be folded in under a bottom or down along the sides. Such so-called corner flap folds are to be found in both the top and the bottom of the brick-shaped packages marketed by Tetra Pak under the trademark Tetra Brik®. If the above-mentioned toggle mechanism is employed for this application, there will moreover be attained an inherent advantage in the change of gear ratio of the toggle joint along its movement. If the package lifter is first started and thereafter the movement of the toggle mechanism is started there will be obtained a high lifting speed initially and thereafter a high convergence speed because of the relatively high gear ratio of the toggle mechanism. At the end of the movement of the toggle mechanism, this has a low gear ratio which entails that the lifting speed will once again be relatively high. This change in gear ratio and difference in starting time may possibly be supplemented by a temporary reduction of the lifting speed in the middle of the movement.

Advantageously, the abutment is connected to at least one elongate element which extends in a direction away from the abutment, towards and past the sealing unit, in which event the elongate elements beyond the sealing unit are disposed to be connected to at least one first operating element, and the operating element is operative to apply a force between the sealing unit and said first operating element so that they are moved in a direction away from one another and so that the abutment and the sealing unit are moved in a direction towards one another. By designing the apparatus in this manner, it is possible to realise a construction where only a limited number of components project over the transport path where those packages which are to be sealed are transported. Moreover, it is simple to design the system so that the abutment and the sealing unit move towards one another at proportional speeds and if the operating unit is rendered symmetrical as regards power supply, the abutment and the sealing unit will move symmetrically towards one another. This symmetric movement is, in many cases, desirable since there will then automatically be obtained a symmetric folding of the package in connection with the sealing operation. Moreover, this construction is desirable since those components which move in the proximity of the path of the package can be designed as simple pull rods while the slightly more complex construction which is required for the operating unit may be placed a distance from the transport path of the package, which entails that it will be easier to maintain a high level of hygiene in the proximity of the package. Simple pull rods are also positive in as much as it is possible to employ a laminar sterile air flow to maintain the level of hygiene high without excessively great disruptions to the air flow.

The above objects have also been attained according to the present invention by means of an apparatus of the type disclosed by way of introduction which has been given the characterising features that, in a nominal end position, the sealing unit and the abutment are brought together to such an extent that a gap is formed between them, the gap being of a width which is less than the total thickness of the material layers which are intended to be sealed together, and preferably less than the total thickness of the material layers which are intended to be sealed together which is obtained when the sealing unit and the abutment are urged against one another with a force which is defined by a force-restricting coupling member. By such means, it will be ensured that it is always possible to obtain a correct compression and sealing at the same time as, by ensuring a gap, it will also be ensured that the abutment and the sealing unit do not come into contact with one another, which implies that, in this regard, the risk of damaging the normally relatively expensive sealing unit has been eliminated.

Advantageously, the abutment and the sealing unit are connected to a common operating unit and are disposed to be brought together towards one another in that both the sealing unit and the abutment are displaced at substantially the same speed profile towards one another and that the package is disposed to be displaced in a direction transversely of the direction of movement of the sealing unit and the abutment. By such means, it is simple to obtain a symmetric compression and forming of the seal. By designing the system so that the package is moved transversely of the direction of movement of the sealing unit and the abutment it is possible to obtain an optional relative movement between the sealing unit and the abutment on the one hand and the package on the other, with the result that it is possible to optimise the movements so as to obtain a correct forming of that portion of the package which is to be sealed.

Advantageously, the apparatus is operative initially to displace the package at a higher speed in the transverse direction than the speed of the sealing unit and the abutment in their respective directions of movement, whereafter the apparatus is operative to move the package at a lower speed in the transverse direction than the speed of the sealing unit and the abutment in their respective directions of movement, whereafter the apparatus is operative to move the package at a higher speed in the transverse direction than the speed of the sealing unit and the abutment in their respective directions of movement. By such means, there will initially be obtained a correct positioning of the package, whereafter the package is clamped together until there is but limited space between the sealing unit and the abutment. In this position, the package described by way of example as tube-shaped is clamped together so that there is formed a so-called praying transverse seal. Thereafter, the apparatus is operative to displace the package at a higher speed in the transverse direction than the speed of the sealing unit and the abutment in their respective directions of movement. By such means, there will be obtained a final compression of that portion of the package which is to be sealed. This compression is, for example, advantageous for packages where the outermost portions of the sealing fin are to be folded in under a bottom or down along the sides. Such so-called corner flap folds are to be found in both the top and the bottom of the brick-shaped package marketed by Tetra Pak under the trademark Tetra Brik®.

The above objects have also been attained according to the present invention by a method of sealing a package, comprising the steps of forming a sheet-shaped or web-shaped packaging blank into a tube in that two edges are fused and welded together in a joint with the one edge overlapping the other edge, orienting the tube so that said joint is turned to face towards an ultrasound sealing unit, for transversely sealing the tube, clamping together the tube between the ultrasound sealing unit and an abutment, activating the ultrasound sealing unit before this and the abutment have approached one another and clamped together the packaging blank to such an extent that a sealing of the packaging blank is realised, by the prior activation of the ultrasound sealing unit, cutting an incision at said joint, the incision extending, on the one hand, along the transverse seal and, on the other hand, extending at least partly through a material layer in said joint, and further converging the ultrasound sealing unit and the abutment so as to realise a seal. By such means, it is possible to realise seals of high quality even if there is varying material thickness, for example because of joints or the like, in that portion which is to be sealed By activating the ultrasound unit before the material has been clamped together to an excessively great extent, the ultrasound horn will cut the material and there will be obtained a distinct and defined incision instead of, in certain cases, uncontrolled crack formation because of excessively high contact pressure. By cutting an incision in the extra material layer, the sealing unit and the abutment will thereafter clamp a substantially uniform material thickness between them along the entire width of the seal, with the result that a uniform sealing quality is obtained throughout the entire width.

BRIEF DESCRIPTION OF THE ACCOMPANYING DRAWINGS

The present invention will now be described in greater detail hereinbelow, with reference to the accompanying schematic Drawings which, for purposes of exemplification, show one currently preferred embodiment of the present invention. In the accompanying Drawings.

DETAILED DESCRIPTION OF ONE PREFERRED EMBODIMENT

Figure 1:
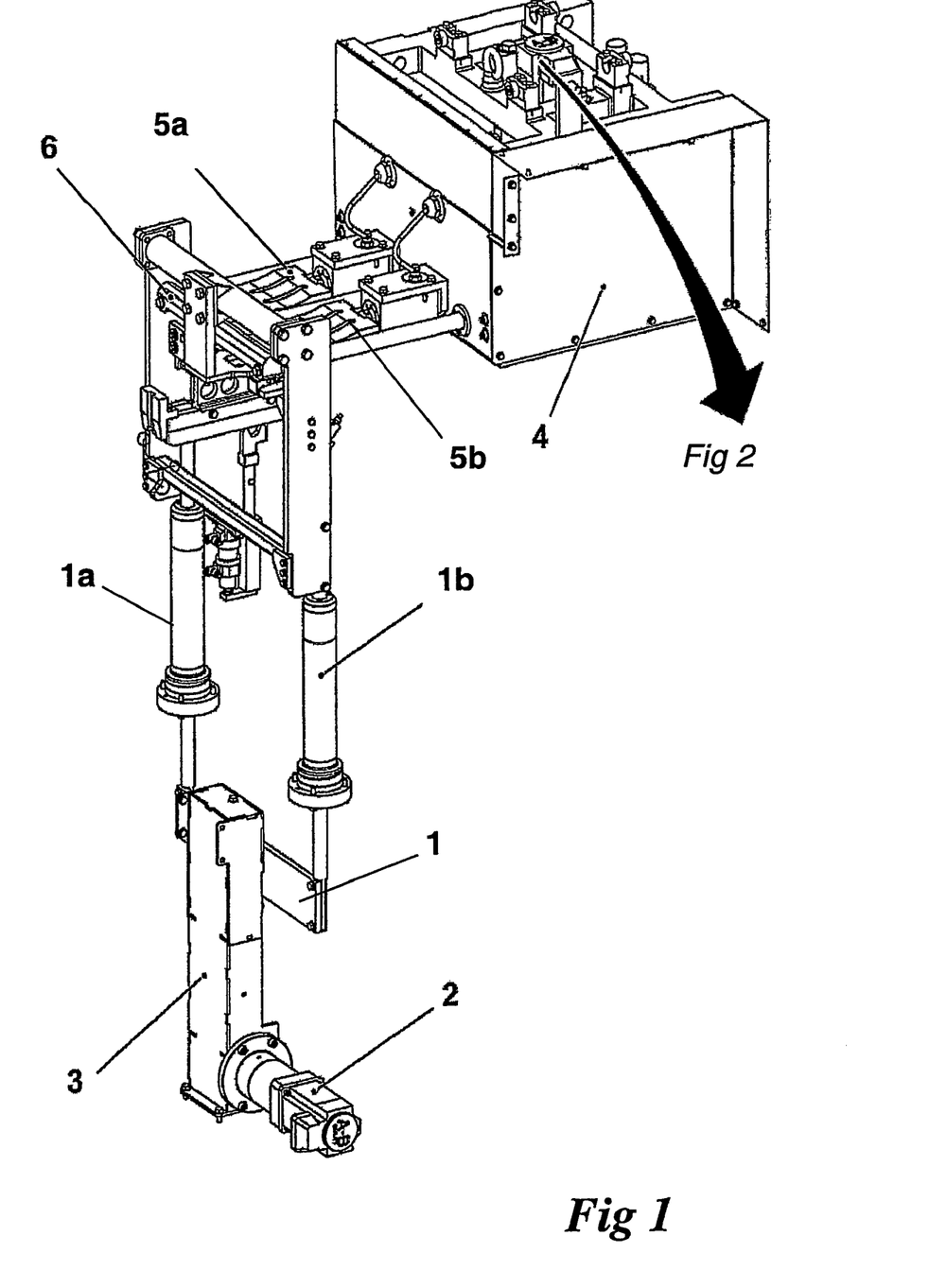
FIG. 1 is a perspective view of an apparatus for the simultaneous sealing of two packages.

The sealing apparatus which will be described in greater detail hereinbelow is adapted for the simultaneous sealing of two packages, but the present invention is naturally applicable to arrangements with sealing of one package at a time or several packages at a time. As is apparent from FIG. 1, the sealing apparatus comprises two package lifters 1a, 1b which, with a cross stay 1, are anchored to a belt drive 3 which is driven by a servomotor 2. The cross stay 1, and thereby the package lifters 1a, 1b will move upwards and downwards when that part of the belt 3 to which the cross stay 1 is secured is moved upwards and downwards by means of the servomotor 2. The packages 10 are disposed to be lifted upwards so that that part which is to be sealed arrives between an ultrasound horn 5a, 5b and an abutment 6 (see also FIG. 4 and FIG. 5). Reference numeral 4 in FIG. 1 relates to a drive unit which encompasses the mechanical driving and the electric driving of the ultrasound horn 5a, 5b.

Figure 2:
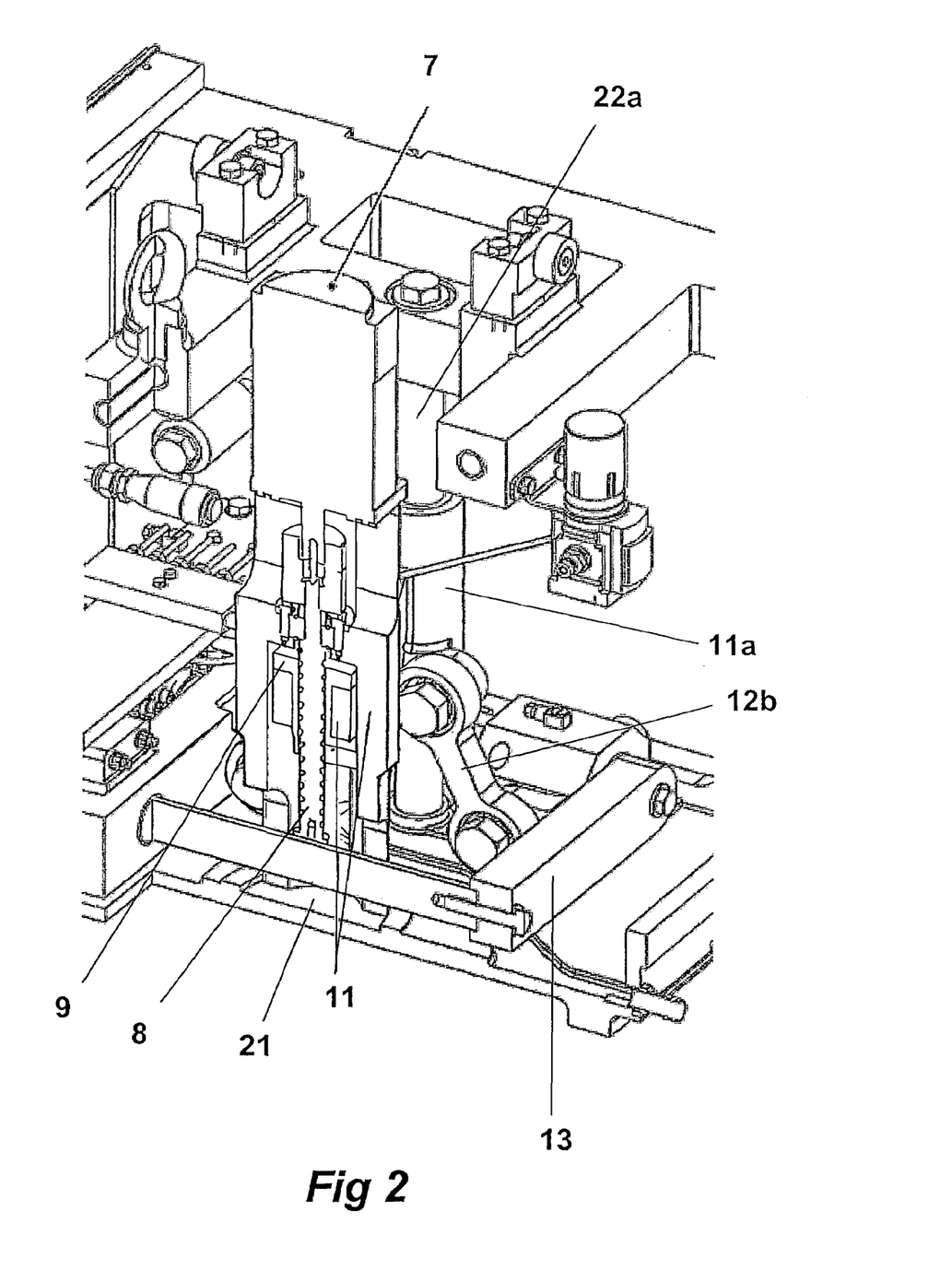
FIG. 2 is a perspective view on a larger scale of a drive means shown in FIG. 1.

FIG. 2 shows a section of a part of the mechanical drive means. The driving is realised by means of an electric servomotor 7 which drives a screw 8 which in turn drives a nut-like construction 9 ball-bearing mounted to the screw so as to move up and down along the screw 8 when the screw 8 is rotated. Such a construction, which is normally designated a ball screw, is commercially available and will not be described in greater detail. As is most clearly apparent from FIG. 6, this nut-like construction 9 is connected to a yoke 11 which extends out from the nut 9 and accompanies this up and down along the screw 8. On either side of, and fixedly anchored to the yoke 11 there are two tubular constructions 11a and 11b vertically slidable along two rods 22a-b each with two linkages 12a-b, 12c-d pivotally anchored to each respective tubular construction 11a-b.

The two linkages 12b, 12d which are disposed on the same side of each respective tube 11a, 11b are, with their other end, pivotally anchored in a common end piece 13. This end piece 13 is anchored to and interconnects three rods 14a-c which are disposed to support the abutment 6 with their ends opposite the end piece 13 (see FIG. 4 and FIG. 6). The other two linkages 12a, 12c which are disposed on the other side of each respective tube 11a, 11b are in their turn pivotally anchored to a common operating carriage 15 which is slidably displaceable in relation to the rods 14a-c. The servomotor 7 is fixedly anchored in relation to the relevant part of the machine frame, which implies that, when the servomotor 7 drives the screw 8, the nut-like construction 9 will move upwards and downwards which in turn implies that the operating carriage 15 and the end piece 13 will move towards one another and away from one another, respectively. In its turn, the operating carriage 15 is connected to the ultrasound units 5a, 5b and, as was previously mentioned, the end piece 13 is connected to the abutment 6 by the intermediary of the rods 14a-c. When the operating carriage 15 and the end piece 13 move towards one another, the abutment 6 and the ultrasound units 5a, 5b will move away from one another, and vice versa.

Figure 3:
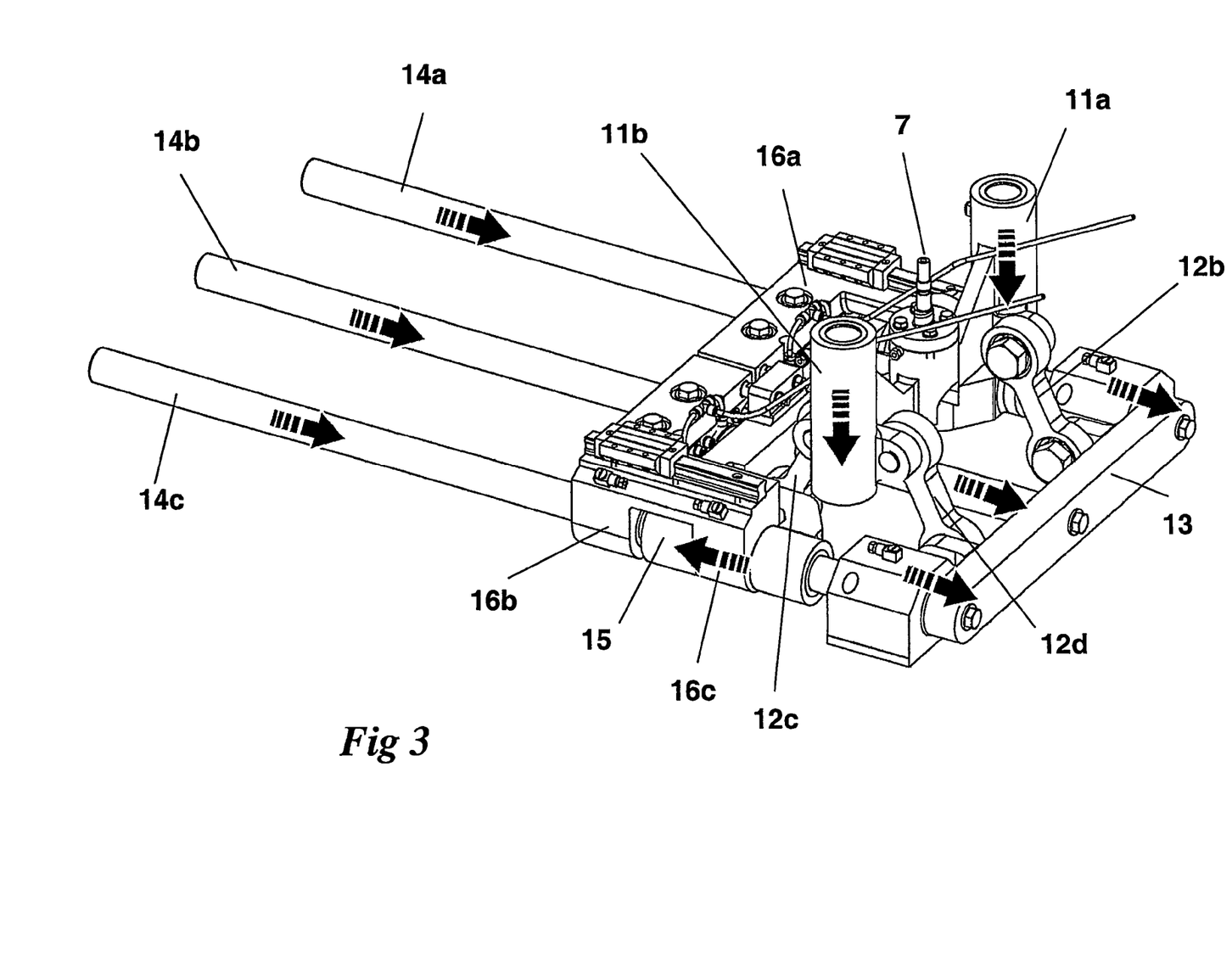
FIG. 3 is a perspective view of the drive mechanisms of the sealing apparatus.
Figures 4, 5:
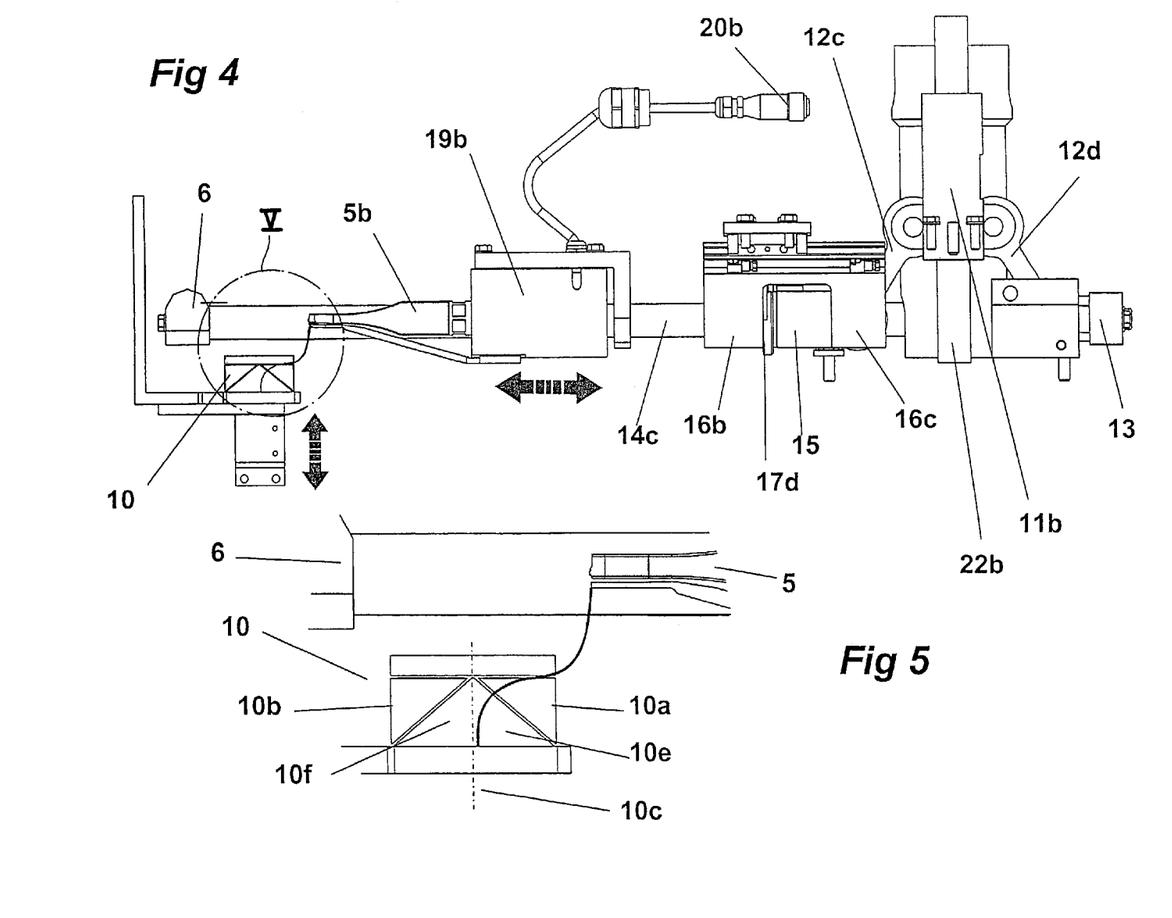
FIG. 4 is a side elevation of the sealing apparatus, the package which is to be sealed and the package lifter, as well as the relative movements of the included components.
FIG. 5 shows, on a larger scale, the relative movement shown in FIG. 4 between the ultrasound sealing horn and the package.

The ultrasound units 5a, 5b are each supported by a carriage 16a, 16b which are individually slidingly journalled on the rods 14a-c and which are individually connected to the operating carriage 15 partly by the intermediary of each of two pneumatic membranes 17a-d and partly by the intermediary each of an overshot 16c-d (most clearly apparent from FIG. 3 and FIG. 4). The pneumatic membranes 17a-b and 17c-d are pairwise connected to two pressure regulators 18 (only one shown) so that those membranes 17a-b and 17c-d which are connected to the same carriage 16a and 16b, respectively, are connected to one and the same pressure regulator 18. Alternatively, use may be made of one regulator 18 which regulates the pressure in all membranes 17*a-d*. The membranes 17*a-d* are always pressurised to a pressure of approximately 24 bar depending upon how wide the seal is which is to be realised. The membranes 17*a-d* will, because of their positioning between the operating carriage 15 and the two carriages 16*a-b*, force these apart until such time as the carriages 16*a-b* in relation to the operating carriage 15 cannot be moved further away but that the overshots 16*c-d* restrict this movement. As long as the system is not loaded with any compressive force on the carriages 16*a-b* in relation to the operating carriage 15, these three carriages will move as a single rigid interlocking movement. When the operating carriage 15 will move away from the servomotor 7 and the carriages 16*a-b* are retarded with a force which exceeds the force of the membranes 17*a-d* at the relevant pressure (and with their given areas), the carriages 16*a-b* will, in relation to the operating carriage 15, be urged more closely thereto against the resistance of the membranes 17*a-d*. Thus, the membranes 17*a-d* will function as a force-restricting element. Even if the operating carriage 15 is strong enough to press the carriages 16*a-b* with a force which exceeds the force of the membranes 17*a-d*, it will not be possible to move the carriages 16*a-b* forwards with a force which exceeds the force of the membranes 17*a-d* at the given pressure. The practical function in connection with the sealing operation will be explained in greater detail below.

In their turn, the carriages 16*a-b* support two ultrasound sealing units each of which comprise an energy converter 19*a-b* which converts electric alternating current into mechanical oscillations, and a sealing horn 5*a*, 5*b* which is disposed to transfer the mechanical oscillation to the package 10 which is to be sealed. Each one of the energy converters 19*a-b* is connected, by the intermediary of a connection 20*a-b*, to some form of generator or the like which supplies the electric energy in the form of voltage and current at the correct frequency and strength. Such units are commercially available and will not be described in greater detail in the present application. The energy converter 19*a-b* normally comprises a stack of so-called piezoelectric elements which, in alternating electric fields, assume different forms.

The starting cycle and production cycle will be described in greater detail in this paragraph. The mechanical function must first be calibrated to the correct setting. The servomotor 7 is then run to an end position so that the above-mentioned tubular constructions 1*a-b* contact with a base plate 21. In this position, the linkages 12*a-d* will stand straight outwards so that they lie in a line parallel with the rods 14*a-c*. From the point of view of power transmission, it is suitable that they moreover lie in the plane which the three rods 14*a-c* tension. When the drive system is in this end position, the ultrasound units 5*a-b* are adjusted and also possibly the abutment 6 so that these abut against each other and are absolutely parallel with each other. Thereafter, a new end position is indicated for the servomotors 7*a-b*. This end position must be slightly above the mechanical end position in order to ensure that the ultrasound units 5*a-b* and the abutment 6 do not come into contact with each other on production if there were to be no package in position and the machine, for some reason or other, were to fail to register that a package is missing. Since the toggle mechanism has a large gear ratio, any possible fault in the servomotor 7 as regards stopping at the correct arrest position will not involve any major difference in end position for the ultrasound units 5*a-b*. The nominal arrest position (between the ultrasound units 5*a-b* and the abutment 6) is, in the present example, set at 0.15 mm. The packaging material has a thickness of approximately of 0.5 mm, which implies that, in the described sealing, 1 mm of material must be clamped between the ultrasound horn 5*a-b* and the abutment 6. In the present case, the packaging material is clamped with a force on sealing which entails that it is compressed to a total thickness of approx. 0.4 mm (two layers times 0.2 mm thickness per layer). The compression of the material in connection with the sealing thus entails that the material attains a thickness of the order of magnitude of 30-60% of the unloaded thickness. In addition, the safety gap is of a width which is of the order of magnitude of 30-60% of the thickness of the compressed packaging material, or a width which is of the order of magnitude of 10-20% of the thickness of the non-compressed packaging material. With this set of relationships between different thicknesses and end positions, there will be obtained a system which reliably realises a correct sealing, but which nevertheless ensures that the parts in the system are not damaged because of collision with each other.

Figures 6, 6A:
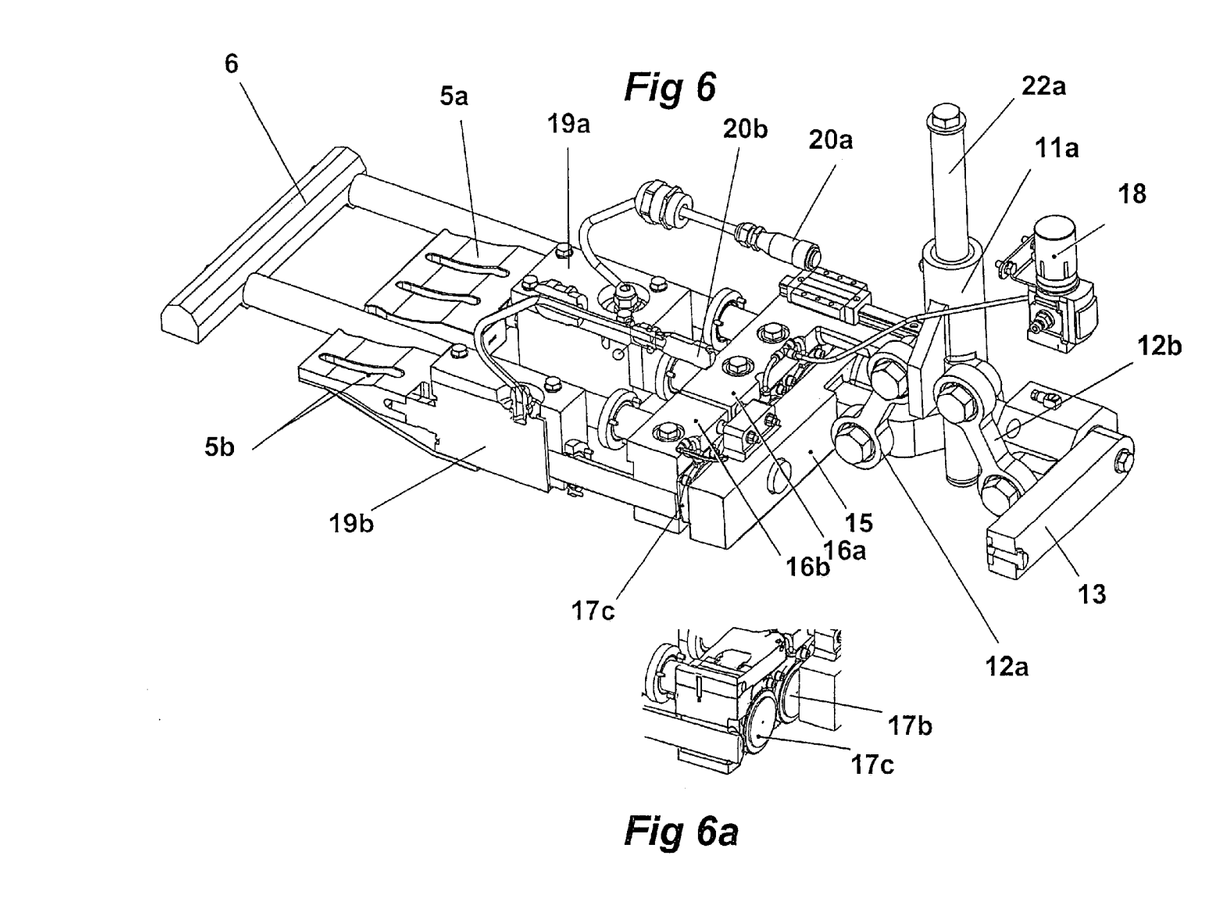
FIG. 6 is a perspective view of the power transmission train of the sealing apparatus between the drive means on the one hand and the ultrasound unit and the abutment on the other.
FIG. 6a is a partial section view showing pneumatic membranes of the power transmission train.
Figure 7:
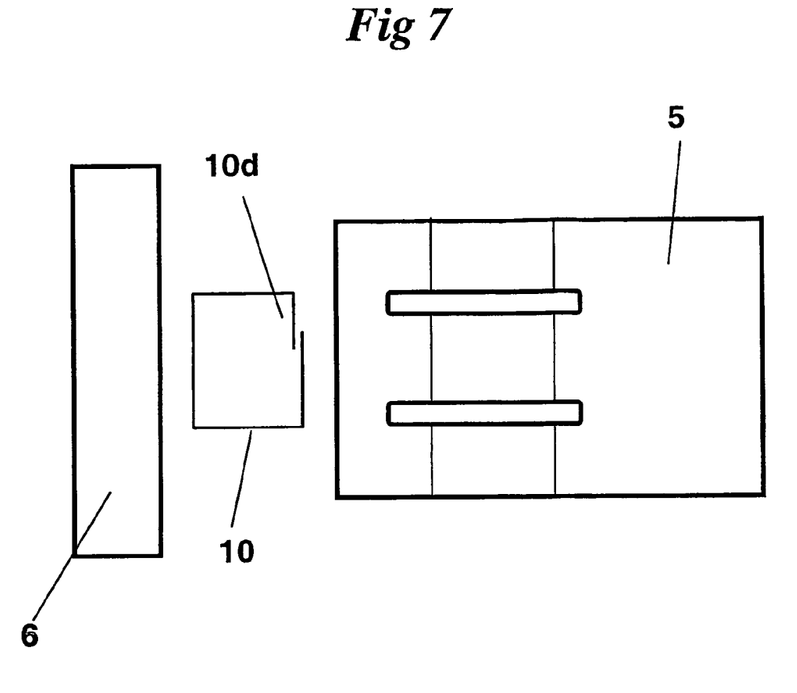
FIG. 7 shows, from above, the orientation of the package which is to be sealed in relation to the ultrasound unit and the abutment.

On production, a package 10 is displaced initially relatively quickly upwards in towards the space between the ultrasound units 5*a-b* and the abutment 6. A slight distance in of this movement, the ultrasound units 5*a-b* and the abutment 6 instead begin to move relatively rapidly in relation to the lifting movement of the package. This convergence of the ultrasound units 5*a-b* and the abutment 6 begins to press together the end of the tube, so that the end becomes like an elongate fin. At the end of the movement, the package 10 will once again be displaced upwards at relatively high speed, with the result that those panels 10*a-b* which are to form the top or bottom in the package are folded so that they become substantially at right angles to the main longitudinal direction 10*c* of the package. This state may be obtained by a conventional Tetra Brik package if the upper corner flaps are released and folded outwards so that they project straight out, whereupon the sealing fin is raised so that it projects straight upwards. Since the abutment 6 and the ultrasound units 5*a-b* move at the same speed, the package will, on either side of the sealing fin, be formed in the same way. FIG. 5 and FIG. 6 show how a point on the ultrasound unit 5*a-b* and a point on the package 10 move in relation to one another. The packaging material which is to be sealed is fixedly clamped between the ultrasound units 5*a-b* and the abutment 6 with a force which becomes greater and greater the further down the servomotor 7 drives the tubes 11*a-b*, in other words the straighter the toggle mechanism 12*a-d* becomes, until such time as the membranes 17*a-d* can no longer transfer greater force. In this position, the abutment 6 will, because of its rigid mechanical connection to the toggle, continue to move a short distance at the same time as the packaging material and the ultrasound units 5*a-b* will be pressed and displaced somewhat back towards the operating carriage 15 which will continue its nominal movement towards the abutment 6, since this is also rigidly connected to the toggle mechanism. Since the membranes 17*a-d* have an inner pressure which is governed by a pressure regulator 18, the clamping force on the packaging material will always be the sum total of the force from the membranes 17*a-d* divided by the abutment area of the ultrasound horn 5*a-b* on the packaging material despite this slight excess movement of the abutment 6 and the operating carriage 15 towards one another.

The packages 10 which are to be sealed are disposed to be turned with their longitudinal overlap joint 10*d* towards the ultrasound horn 5*a-b*. The ultrasound horns 5*a-b* are disposed to be activated before the material has been clamped together to such an extent that activation of the ultrasound horns 5*a-b* results in a welding and fusing together of the package. This entails that the ultrasound horns 5*a-b* will cut an incision through the extra material layer which the package 10 displays at the overlap joint 10d. When the ultrasound horns 5a-b have cut through the extra material layer (which is of limited extent along the front side of the ultrasound horn), the clamping force will be transferred along the entire width of the ultrasound horns 5a-b, with the result that the force of the ultrasound horns 5a-b will give a considerably lower contact pressure on the surface of the packaging material, which in turn entails that the ultrasound horn 5a-b no longer clamps with a force which causes cutting of the surface in the packaging material.

Figure 8:
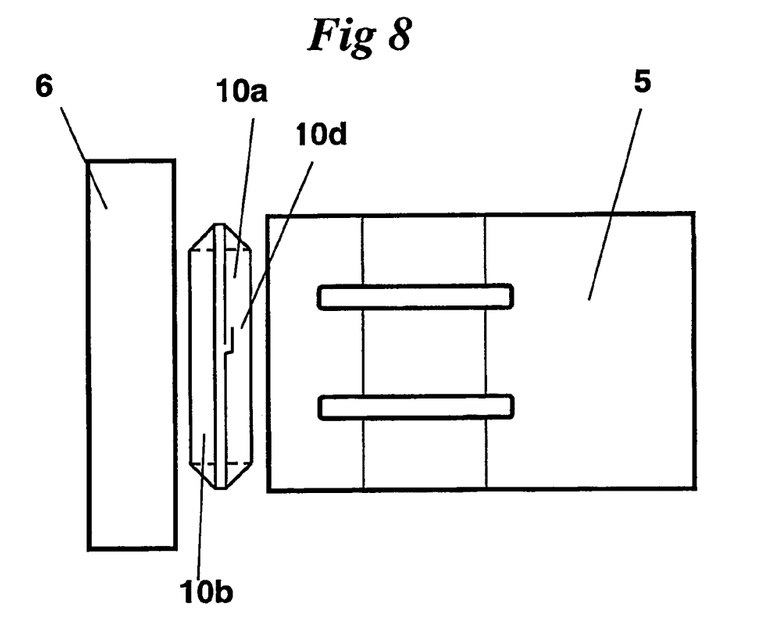
FIG. 8 shows, from above, the configuration of the package when it is sealed between the ultrasound unit and the abutment.

When the ultrasound horn 5a-b and the abutment 6 have been urged against one another and realise the sealing, the package displays that configuration which is obtained if a conventional brick-shaped package is taken and the corner flaps are lifted up from the sides or the bottom corner flaps are folded out from the bottom so that they project straight out and so that the fin projects straight from the package. FIG. 8 shows the appearance of the package 10 seen from above. The top panels 10a-b and the corner panels 10e-f (see FIG. 5) are substantially parallel with the rods 14a-c and turned to face upwards, while the corner panels 10e-f are turned to face downwards.

The invention claimed is:

1. An apparatus for sealing a package, comprising a sealing unit and an abutment between which a number of material layers are disposed to be clamped and sealed and fused together, the abutment is connected to at least one elongate element which extends in a direction from the abutment towards and past the sealing unit, the at least one elongate element, beyond the sealing unit is disposed to be connected to at least one first operating element, and an operating unit is disposed to apply a force between the sealing unit and said first operating element so that the sealing unit and the first operating element are displaced in a direction from one another and so that the abutment and the sealing unit are displaced in a direction towards one another, wherein the force from the operating unit is applied to the sealing unit by the intermediary of a second operating element comprising at least one force-restricting coupling member which is disposed to restrict force between the second operating element and the sealing unit and thereby force between the abutment and the sealing unit, and wherein the at least one force-restricting coupling member is disposed between the sealing unit and the first operating element.

2. The apparatus as claimed in claim 1, wherein the second operating element comprises at least a first and a second component, the first component being disposed to at least partly surround the second component and the force-restricting coupling member, the coupling member being disposed to apply a force between the first and second components so that the first and second components strive to be urged away from one another, and the striving to be urged away from one another is restricted by a portion of the first component which surrounds the second component and is disposed to abut against the second component.

3. The apparatus as claimed in claim 2, wherein said coupling member comprises a membrane whose outward flexing is disposed to be operated by a pressurised fluid.

4. The apparatus as claimed in claim 3, wherein the operating unit comprises an interconnection member displaceable substantially transversely of a direction of movement of the sealing unit and the abutment, the interconnection unit being connected to the sealing unit by the intermediary of a first linkage which is pivotally connected to the interconnection member and the intermediary of said first and second components of the second operating element which is not connected to the sealing unit and which is connected to the first operating element by the intermediary of a second linkage which is pivotally connected to the interconnection member and the second operating element.

5. The apparatus as claimed in claim 3, wherein the second operating element is slidably connected to said at least one elongate element.

6. The apparatus as claimed in claim 2, wherein the operating unit comprises an interconnection member displaceable substantially transversely of a direction of movement of the sealing unit and the abutment, the interconnection unit being connected to the sealing unit by the intermediary of a first linkage which is pivotally connected to the interconnection member and the intermediary of said first and second components of the second operating element which is not connected to the sealing unit and which is connected to the first operating element by the intermediary of a second linkage which is pivotally connected to the interconnection member and the second operating element.

7. The apparatus as claimed in claim 2, wherein the second operating element is slidably connected to said at least one elongate element.

8. The apparatus as claimed in claim 1, wherein the operating unit comprises an interconnection member displaceable substantially transversely of a direction of movement of the sealing unit and the abutment, the interconnection unit being connected to the sealing unit by the intermediary of a first linkage which is pivotally connected to the interconnection member and the intermediary of first and second components of the second operating element which is not connected to the sealing unit and which is connected to the first operating element by the intermediary of a second linkage which is pivotally connected to the interconnection member and the second operating element.

9. The apparatus as claimed in claim 8, wherein the second operating element is slidably connected to said at least one elongate element.

10. The apparatus as claimed in claim 1, wherein the second operating element is slidably connected to said at least one elongate element.

11. The apparatus as claimed in claim 1, wherein the operating unit is disposed, in a nominal end position, to converge the sealing unit and the abutment to such an extent that a gap is formed between them, said gap being of a width which is less than a total thickness of material layers which are intended to be sealed and fused together obtained when the sealing unit and the abutment are urged towards one another with a force which is defined by a force-restricting coupling member.

12. The apparatus as claimed in claim 1, wherein the force-restricting coupling member is configured to restrict a pushing force of the sealing unit.

* * * * *

UNITED STATES PATENT AND TRADEMARK OFFICE
CERTIFICATE OF CORRECTION

PATENT NO. : 7,665,276 B2  Page 1 of 1
APPLICATION NO. : 10/577039
DATED : February 23, 2010
INVENTOR(S) : Delén et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 287 days.

Signed and Sealed this

Seventh Day of December, 2010

David J. Kappos
*Director of the United States Patent and Trademark Office*